(12) United States Patent
Kim

(10) Patent No.: US 9,037,192 B2
(45) Date of Patent: May 19, 2015

(54) APPARATUS AND METHOD FOR RECOGNIZING EXTERNAL MEMORY CARD IN MOBILE TERMINAL

(75) Inventor: In-Soo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 748 days.

(21) Appl. No.: 12/818,643

(22) Filed: Jun. 18, 2010

(65) Prior Publication Data

US 2010/0323759 A1 Dec. 23, 2010

(30) Foreign Application Priority Data

Jun. 18, 2009 (KR) ........................ 10-2009-0054366

(51) Int. Cl.
*H04W 88/02* (2009.01)
*G06F 9/455* (2006.01)
*H04M 1/725* (2006.01)

(52) U.S. Cl.
CPC ....... *G06F 9/45558* (2013.01); *H04M 1/72522* (2013.01); *G06F 2009/45579* (2013.01)

(58) Field of Classification Search
CPC ................ H04M 1/72522; G06F 2009/45579; G06F 9/45558
USPC ........................... 711/100, 115, 154; 455/557
See application file for complete search history.

(56) References Cited

U.S. PATENT DOCUMENTS

2007/0258109 A1* 11/2007 Sasaki ......................... 358/1.16
2008/0062184 A1* 3/2008 Maeda .......................... 345/530
2008/0172513 A1* 7/2008 Chen ............................. 710/302

FOREIGN PATENT DOCUMENTS

KR 10-2007-0090914 A 9/2007

* cited by examiner

*Primary Examiner* — Jasmine Song
(74) *Attorney, Agent, or Firm* — Jefferson IP Law, LLP

(57) ABSTRACT

An apparatus and method for recognizing an external memory in a mobile terminal are provided. The apparatus includes an external memory manager for recognizing as if an external memory was attached without a separate external memory by defining a built-in memory as a virtual external memory after a booting process.

24 Claims, 5 Drawing Sheets

APPARATUS AND METHOD FOR RECOGNIZING EXTERNAL MEMORY CARD IN MOBILE TERMINAL

PRIORITY

This application claims the benefit under 35 U.S.C. §119(a) of a Korean patent application filed in the Korean Intellectual Property Office on Jun. 18, 2009 and assigned Serial No. 10-2009-0054366, the entire disclosure of which is hereby incorporated by reference.

BACKGROUND OF THE INVENTION

1. Field of the Invention

The present invention relates to a mobile terminal, without a built-in memory, that operates with only one external memory. More particularly, the present invention relates to an apparatus and a method for operating an application of a mobile terminal without an external memory that supports only one external memory.

2. Description of the Related Art

Recently, mobile terminals have become a necessity and are widely used. Service providers and terminal manufacturers have competitively developed products (or services) to differentiate from other companies.

For example, a mobile terminal has been developed into a multimedia apparatus that can provide a phonebook, games, a Short Message Service (SMS), an Electronic (E)-mail, a Motion Picture Expert Group Audio Layer-3 (MP3) player, a digital camera module and a wireless Internet service, and provides various services.

The mobile terminal that provides the digital camera module can capture various images. As pixels of the digital camera module increase, the mobile terminal can function as a high performance digital camera.

In addition, as a data storage space of the mobile terminal increases, a large amount of data, such as image files, moving image files and music files can be stored. The mobile terminal may include a large capacity storage space or an external memory may be attached, which is an auxiliary storage space, to store the large amount of data.

The external memory extends the storage space of the mobile terminal as an assistant for storage space shortage. However, some of mobile terminals that support the external memory have problems in which a specific application cannot be executed when the external memory is not attached.

Some of the mobile terminals that support the external memory also support only one external memory without a built-in memory. The mobile terminals support only one external memory (e.g., Secure Digital (SD) card), and may use only the external memory without a built-in memory, but in a case where the external memory is not attached to the mobile terminal, a specific application cannot be executed. For example, in a case where the mobile terminal that supports only one external memory performs a camera function without the external memory, the mobile terminal cannot perform an operation for image capturing. In addition, in a case where the mobile terminal, which supports only one memory card, downloads an application, the mobile terminal has to attach the external memory to use the application.

Therefore, a need exists for an apparatus and a method for operating a specific application without attaching an external memory.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for operating an application in a case where an external memory does not exist in a mobile terminal that supports only one external memory.

Another aspect of the present invention is to provide an apparatus and a method for recognizing a built-in memory as an external memory in a mobile terminal.

Still another aspect of the present invention is to provide an apparatus and a method for recognizing as if an external memory was continuously attached to a mobile terminal by generating a dummy informing of detachment/attachment of the external memory in the mobile terminal.

In accordance with an aspect of the present invention, an apparatus for recognizing an external memory in a mobile terminal is provided. The apparatus includes an external memory manager for recognizing as if an external memory was attached without a separate external memory by defining a built-in memory as a virtual external memory after a booting process.

In accordance with another aspect of the present invention, a method for recognizing an external memory in a mobile terminal is provided. The method includes recognizing as if an external memory was attached without a separate external memory by defining a built-in memory as a virtual external memory after a booting process.

In accordance with still another aspect of the present invention, a mobile terminal for recognizing only one external memory is provided. The mobile terminal includes an external memory manager for setting one of a built-in memory and an external memory to a storage memory during a booting process, and for changing the memory setting based on attachment or detachment of the external memory.

In accordance with yet another aspect of the present invention, a method for recognizing an external memory in a mobile terminal. The method includes setting one of a built-in memory and an external memory to a storage memory during a booting process, and changing the memory setting based on attachment or detachment of the external memory.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide an apparatus and a method for operating an application in a case where a external memory does not exist in a mobile terminal that supports only one external memory.

Figure 1:
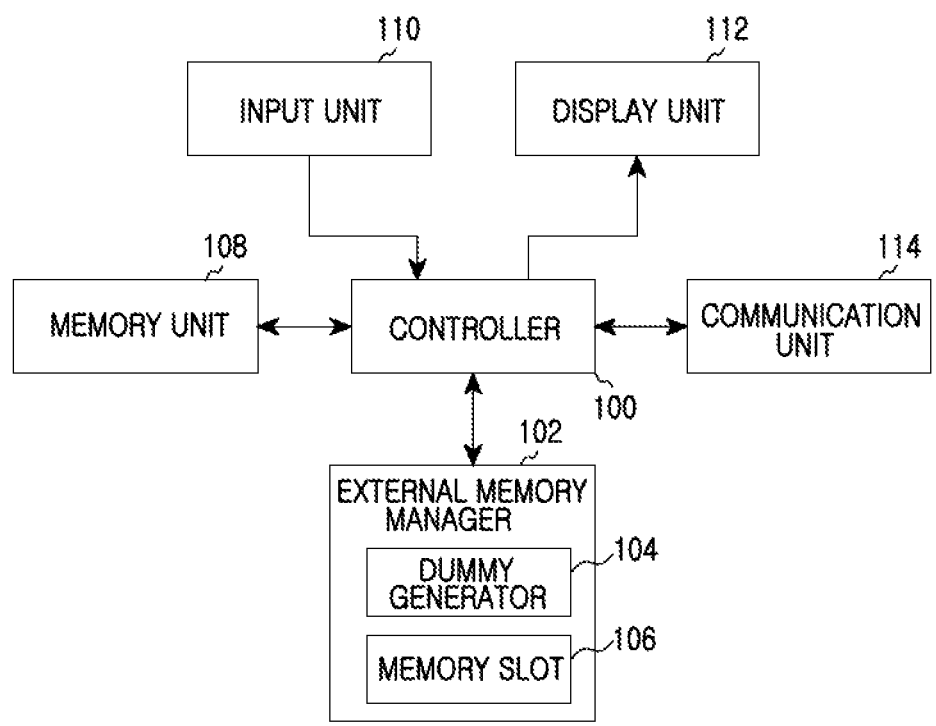
FIG. 1 is a block diagram illustrating a mobile terminal according to an exemplary embodiment of the present invention.

FIG. 1 is a block diagram illustrating a mobile terminal according to an exemplary embodiment of the present invention.

Referring to FIG. 1, the mobile terminal includes a controller 100, an external memory manager 102, a memory unit 108, an input unit 110, a display unit 112, and a communication unit 114. The external memory manager 102 may include a dummy generator 104 and a memory slot 106.

The controller 100 of the mobile terminal controls overall operations of the mobile terminal. For example, the controller 100 processes and controls voice communication and data communication. In addition to general functions of the mobile terminal, the controller 100 determines if an external memory is attached to the mobile terminal that supports only one external memory, by recognizing a built-in memory as a virtual external memory. By recognizing the built-in memory as the virtual external memory, a problem in which an application cannot be driven because the external memory does not exist while a booting process is performed with the external memory not attached to a mobile terminal is addressed. Therefore, to execute the application, the mobile terminal recognizes the built-in memory as the external memory even though the external memory has not been attached.

Additionally, in a case of detecting the external memory after recognizing the built-in memory as the virtual external memory, to address a problem in which the mobile terminal recognizes as if another external memory was attached with the virtual external memory, the controller 100 generates a dummy informing of detachment of the external memory and generates a signal informing of attachment of the external memory to recognize as if the external memory was continuously attached.

When determining if the external memory is attached and then detached, the controller 100 recognizes as if the external memory was continuously attached by generating a signal informing of detachment of the external memory and then generating a dummy informing of attachment of the external memory.

When performing a booting process without an external memory, the external memory manager 102 determines as if the external memory was attached by recognizing the built-in memory as a virtual external memory under control of the controller 100.

Additionally, when attachment/detachment of an external memory is determined after booting, the external memory manager 102 of the mobile terminal allows the mobile terminal to determine as if the external memory was continuously attached by generating a dummy based on the attachment/detachment of the external memory.

When attachment/detachment of the external memory is determined, the dummy generator 104 of the external memory manager 102 generates a dummy that allows the mobile terminal to determine as if the external memory was continuously attached. The dummy generator 104 is described in more detail below.

When determining if an external memory is attached to the mobile terminal, to address a problem in which the mobile terminal recognizes as if another external memory was attached with the virtual external memory, the dummy generator 104 generates a dummy informing of detachment of the external memory. Accordingly, the mobile terminal recognizes as if the external memory (i.e., virtual external memory) was detached by receiving the dummy informing of the detachment of the external memory, and then recognizes as if the external memory (i.e., another external memory) was attached again by receiving a signal informing of the attachment of the external memory.

Additionally, when the external memory is detached and a signal informing of the detachment of the external memory occurs, the dummy generator 104 recognizes as if the external memory was continuously attached by generating a dummy informing of attachment of the external memory.

The memory slot 106 of the external memory manager 102 is a slot that attaches/detaches the external memory. When the external memory is attached, the memory slot 106 generates a signal informing of attachment of the external memory. When the external memory is detached, the memory slot 106 generates a signal informing of detachment of the external memory.

The external memory manager 102 may be located inside the controller.

The memory unit 108 may include, for example, a Read Only Memory (ROM), a Random Access Memory (RAM), a flash ROM, and the like. The ROM stores microcodes (i.e., code) of programs for process and control of the controller 100 and the external memory manager 102, and various reference data.

The RAM functions as a working memory of the controller 100 and stores temporary data that occurs during execution of various programs. The flash ROM stores various updatable data for storage such as a phonebook, calling messages, reception messages, information of a user's touch input, and the like.

The input unit 110 includes a plurality of function keys such as numerical key buttons of 0 to 9, a menu button, a cancel (delete) button, an OK button, a TALK button, an END button, an Internet access button, navigation key (or direction key) buttons, letter input keys, and the like. Key input data (e.g., a motion detection function operation), which is input when the user presses the function keys, is provided to the controller 100.

The display unit 112 displays status information generated during an operation of the mobile terminal, a limited number of letters, a large amount of moving images, still images, and the like. The display unit 112 may be a color Liquid Crystal Display (LCD), an Active Mode Organic Light Emitting Diode (AMOLED), and the like. The display unit 112 may include a touch input device that can be used as an input unit when applied to a touch input type mobile terminal.

The communication unit 114 transmits/receives a Radio Frequency (RF) signal of data input/output via an antenna (not illustrated). For example, during transmission, the communication unit 114 channel-codes and spreads data to be transmitted, and performs an RF process on the signal to transmit the signal. During reception, the communication unit 114 converts a received RF signal into a baseband signal, and despreads and channel-decodes the baseband signal to recover data.

The function of the external memory manager 102 may be performed by the controller 100 of the mobile terminal A separate configuration and illustration of the external memory manager 102 may be illustrated for convenience of description, but is not limited thereto. It should be noted that those ordinary skilled in the art can understand that various modifications may be made within the scope of the present invention. For example, all functions of the external memory manager 102 may be processed by the controller 100.

Figure 2A:
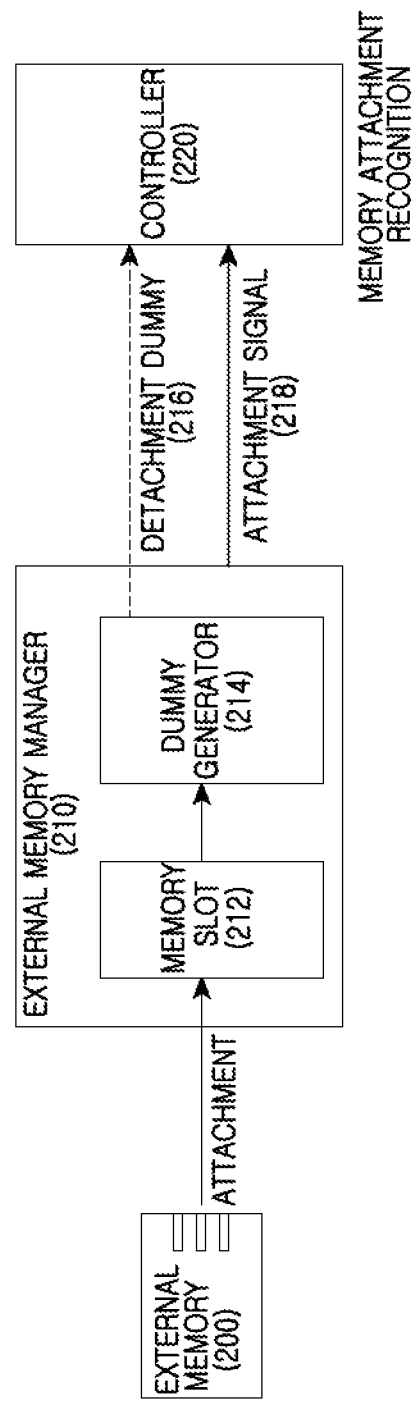
FIG. 2A is a view illustrating an operating process according to attachment of an external memory in a mobile terminal according to an exemplary embodiment of the present invention.
Figure 2B:
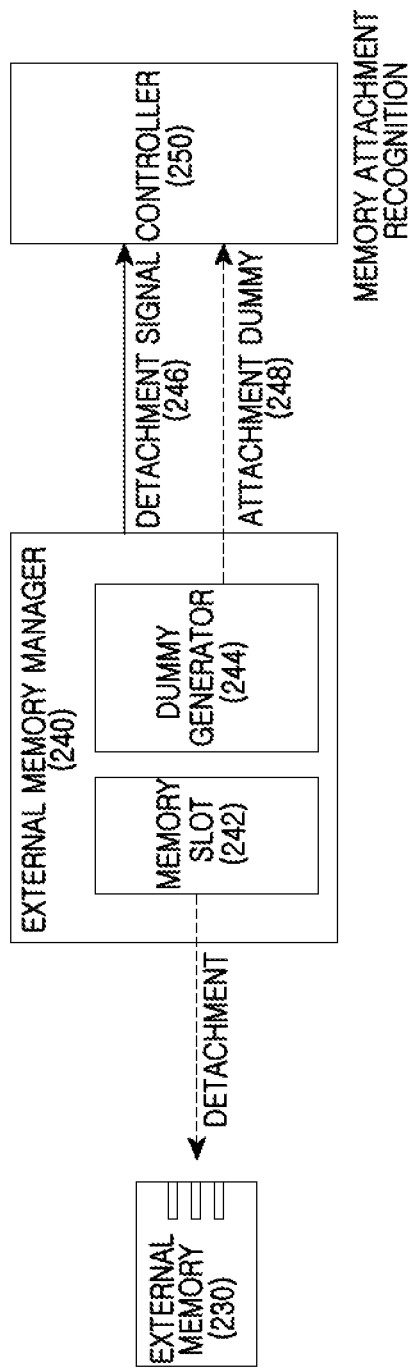
FIG. 2B is a view illustrating an operating process according to detachment of an external memory in a mobile terminal according to an exemplary embodiment of the present invention.

FIGS. 2A and 2B are views illustrating a process for recognizing an external memory in a mobile terminal according to an exemplary embodiment of the present invention.

In FIGS. 2A and 2B, the mobile terminal recognizes a built-in memory as a virtual external memory after performing a booting process according to an exemplary embodiment of the present invention. Thereafter, the mobile terminal sets the virtual external memory or an external memory to a storage memory based on attachment/detachment of the external memory.

FIG. 2A is a view illustrating an operating process according to attachment of an external memory in a mobile terminal according to an exemplary embodiment of the present invention.

Referring to FIG. 2A, the mobile terminal performs a booting process without an external memory attached. In this state, the mobile terminal according to the related art cannot drive an application because the external memory does not exist. However, in an exemplary implementation, the mobile terminal determines as if an external memory was attached by recognizing a built-in memory as a virtual external memory, to allow an application to be driven.

In this state, when a user attaches another external memory 200 to the mobile terminal, the mobile terminal recognizes that the other memory is attached by receiving a signal informing of attachment of an external memory, so that an error may be generated to an operation of the application.

To address the above problem, when determining that the external memory 200 is attached to a memory slot 212, an external memory manager 210 of the mobile terminal allows a dummy generator 214 to generate a dummy informing of detachment of the virtual external memory.

That is, the dummy generator 214 generates a dummy informing of the detachment of the external memory and transmits the detachment dummy 216 to a controller 220 of the mobile terminal.

Thereafter, the external memory manager 210 provides an attachment signal 218 informing of attachment of a real external memory 200 attached to the memory slot 212 to the controller 220. The controller 220 of the mobile terminal receives the detachment dummy 216 informing of detachment of the virtual external memory, and determines as if the external memory 200 was attached again to the mobile terminal by receiving the attachment signal 218 informing of the attachment of the real external memory 200.

FIG. 2B is a view illustrating an operating process according to detachment of an external memory in a mobile terminal according to an exemplary embodiment of the present invention.

Referring to FIG. 2B, the mobile terminal performs a booting process with an external memory attached.

In this state, when a user detaches an external memory 230 from the mobile terminal, the mobile terminal recognizes that the external memory is detached by receiving a signal informing of the detachment of the external memory 230, so that an error is generated to an operation of an application.

To address the above problem, when determining that the external memory 230 is detached from a memory slot 242, an external memory manager 240 of the mobile terminal transmits a detachment signal 246, informing that the external memory is detached from the memory slot 242, to a controller 250 of the mobile terminal.

Thereafter, the external memory manager 240 allows a dummy generator 244 to generate a dummy informing of attachment of an external memory.

That is, the dummy generator 240 generates the dummy informing of the attachment of a virtual external memory and transmits the attachment dummy 248 to a controller 250 of the mobile terminal.

The controller 250 of the mobile terminal receives the signal informing of detachment of the real external memory, and the attachment dummy 248 informing of attachment of the virtual external memory, so that the controller 250 determines as if the external memory is continuously attached to the mobile terminal even though the real external memory 230 is detached.

An apparatus for operating a mobile terminal without an external memory in the mobile terminal that supports only one external memory and cannot operate an application when the external memory does not exist has been described above. In the following description, a method for operating the mobile terminal without an external memory according to an exemplary embodiment of the present invention will be described below.

Figure 3:
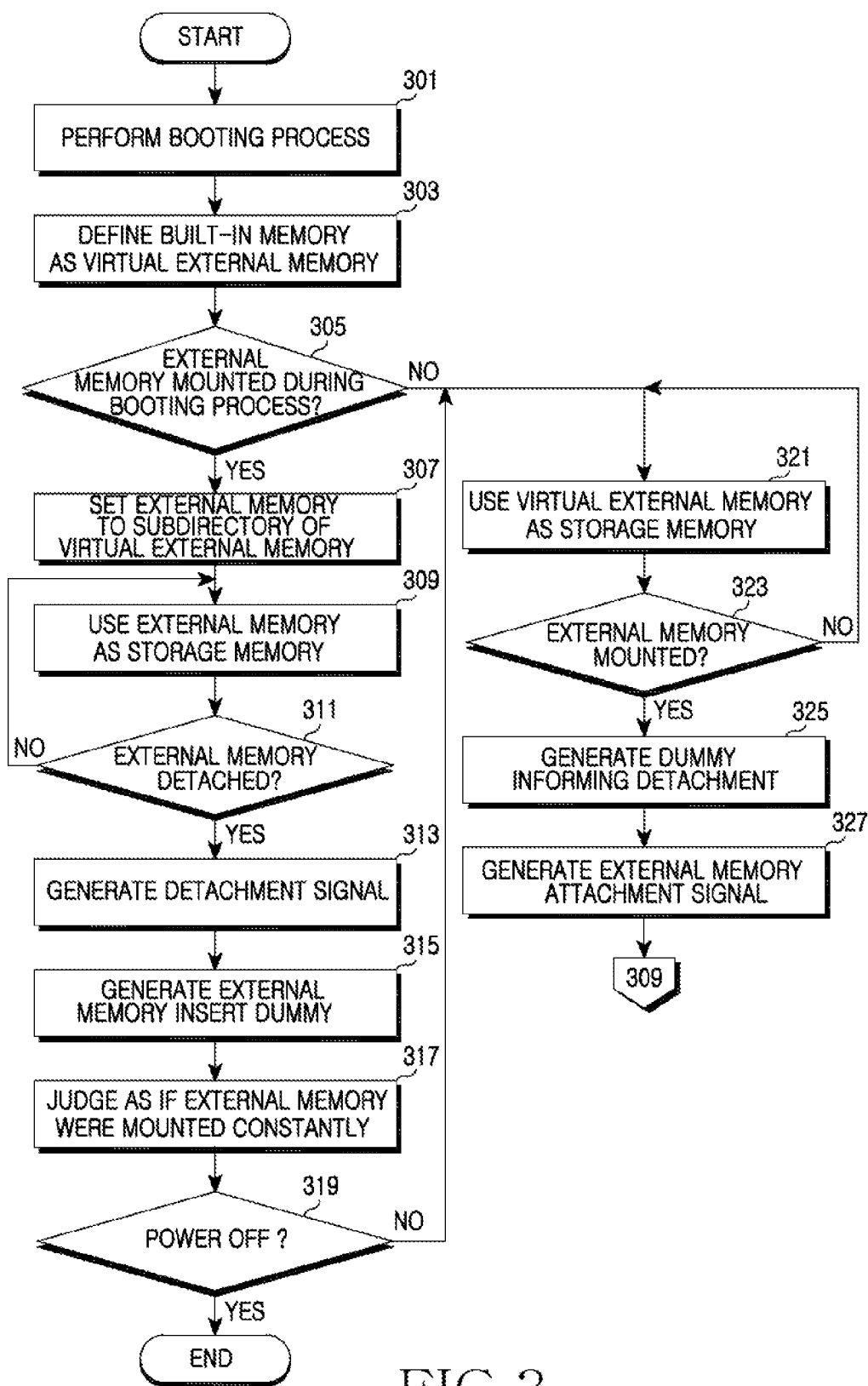
FIG. 3 is a flowchart illustrating a process for recognizing an external memory in a mobile terminal according to an exemplary embodiment of the present invention.

FIG. 3 is a flowchart illustrating a process for recognizing an external memory in a mobile terminal according to an exemplary embodiment of the present invention.

The mobile terminal supports only one external memory, may use an external memory without a built-in memory, and cannot operate an application when the external memory does not exist. Hereinafter, an exemplary embodiment of the present invention provides a method for operating an application without an external memory attached to the mobile terminal.

Referring to FIG. 3, the mobile terminal performs a booting process in step 301, and defines a built-in memory as a virtual external memory in step 303.

The mobile terminal determines whether an external memory has been attached during the booting process in step 305.

To address a problem in which a specific application cannot operate without an external memory in the mobile terminal according to the related art, the built-in memory may be defined as the virtual external memory in step 303.

If it is determined that the external memory has been attached during the booting process in step 305, the mobile terminal sets the external memory to a subdirectory of the virtual external memory in step 307. The mobile terminal uses the external memory as a storage memory to store data generated during an operation of the mobile terminal in step 309.

If it is determined that the external memory has not been attached during the booting process in step 305, the mobile terminal recognizes the virtual external memory, that is, the built-in memory defined as the virtual external memory in step 303 as the external memory, and uses the virtual external memory as the storage memory in step 321.

Therefore, the mobile terminal may recognize the built-in memory as the virtual external memory to operate the application when performing booting without the external memory.

However, in a case where attachment/detachment of the external memory occurs in the mobile terminal that has set the virtual external memory, an error may occur due to signal collision by attachment/detachment of the external memory. That is, in a case of detaching the external memory from the mobile terminal that has performed booting with the external memory attached, an error may be generated to an operation of the application due to the detachment of the external memory. Also, in a case of attaching the external memory to the mobile terminal that has performed booting with the external memory detached, the mobile terminal recognizes as if another external memory was attached while recognizing the virtual external memory, so that an error may be generated to an operation of the application.

To address the above problem, the mobile terminal may perform the following operation.

When the mobile terminal attaches the external memory during the booting process and uses the external memory as the storage memory in step 309, the mobile terminal determines whether the already attached external memory is detached in step 311.

If it is determined that the external memory is not detached in step 311, the mobile terminal uses the external memory as the storage memory in step 309.

If it is determined that the external memory is detached in step 311, the mobile terminal generates a detachment signal informing of the detachment of the external memory in step 313. The mobile terminal generates a dummy informing of insertion of the external memory to set a built-in memory as a virtual external memory in step 315.

This allows the mobile terminal to recognize as if the external memory is continuously attached using the dummy informing of the insertion of the external memory even though the external memory of the mobile terminal has been detached.

In step 317, the mobile terminal determines as if the external memory was continuously attached using the dummy informing of the insertion of the external memory of step 315. The mobile terminal also determines whether power of the mobile terminal is turned off in step 319.

If it is determined that the power of the mobile terminal is not turned off in step 319, the mobile terminal uses a virtual external memory as a storage memory because the real external memory has been detached in step 321.

In contrast, when the power of the mobile terminal has been turned off in step 319, the mobile terminal ends the algorithm.

A case where the mobile terminal attaches an external memory while performing booting and uses the external memory as a storage memory has been described above. A case where the mobile terminal does not attach an external memory while performing booting will be described below.

If it is determined that the external memory is not attached during the booting process in step 305, the mobile terminal uses the virtual external memory, that is, the built-in memory as the storage memory because the external memory has not been attached in step 321, and determines whether the external memory is attached in step 323.

If it is determined that the external memory is not attached in step 323, the mobile terminal maintains a process of using the virtual external memory as the storage memory in step 321.

In contrast, if it is determined that the external memory is attached in step 323, the mobile terminal generates a dummy informing of detachment of the external memory in step 325. The mobile terminal generates an external memory attachment signal in step 327.

Accordingly, if the external memory is not attached to the mobile terminal, the dummy informing of the detachment of the external memory is generated when the external memory is attached. As a result, in order to prevent an error from occurring in the mobile terminal due to signal collision when the mobile terminal receives a signal informing that another external memory has been attached, the mobile terminal determines that the external memory is attached and uses the virtual external memory. That is, the mobile terminal maintains a state where the external memory is continuously attached by generating a signal informing of the attachment of the real external memory after generating the dummy informing of the detachment of the virtual external memory.

The mobile terminal uses the external memory attached in step 323 as the storage memory in step 309.

Figure 4:
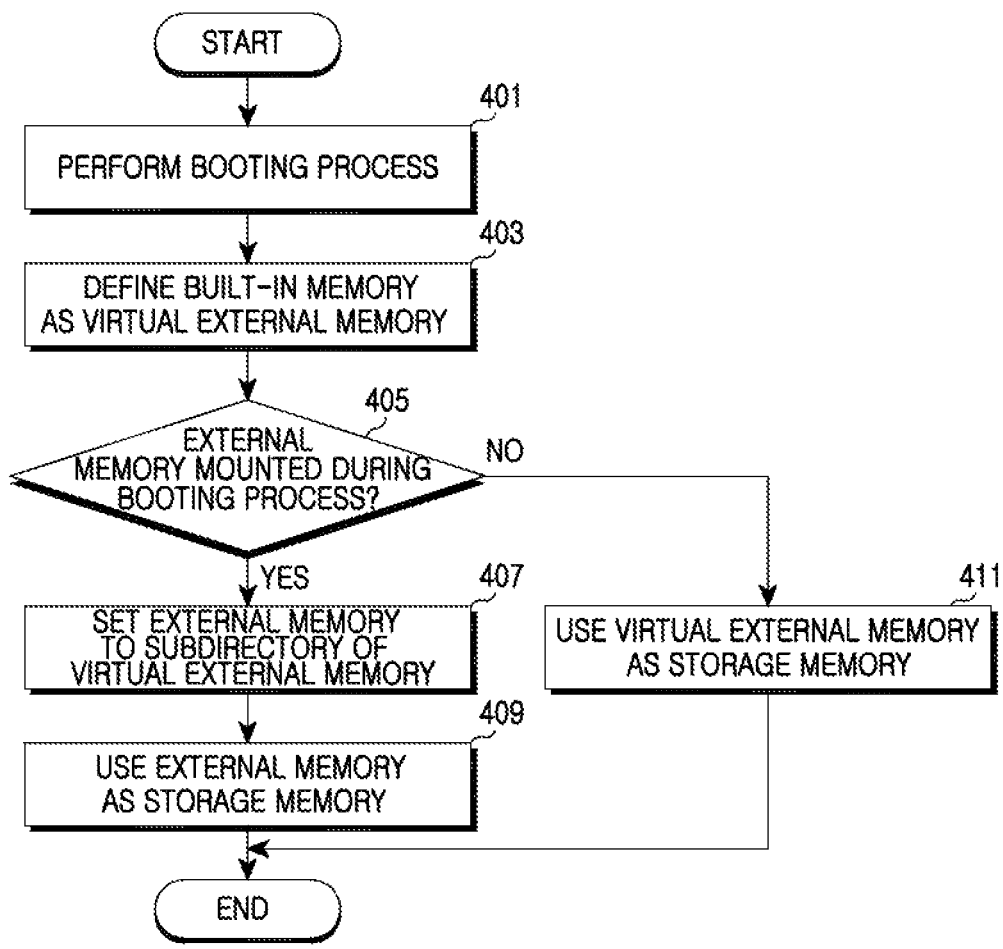
FIG. 4 is a flowchart illustrating a process for recognizing an external memory in a mobile terminal according to an exemplary embodiment of the present invention.

FIG. 4 is a flowchart illustrating a process for recognizing an external memory in a mobile terminal according to an exemplary embodiment of the present invention.

The mobile terminal includes a slot from which an external memory is detachable after a battery is removed.

Referring to FIG. 4, the mobile terminal performs a booting process in step 401, and defines a built-in memory as a virtual external memory and uses the virtual external memory as a storage memory in step 403.

Therefore, the mobile terminal recognizes the built-in memory as the virtual external memory to allow an application to operate even when the mobile terminal performs booting without an external memory.

The mobile terminal performs a process of determining whether an external memory is attached during the booting in step 405.

If it is determined that the external memory is attached during the booting process in step 405, the mobile terminal sets the external memory to a subdirectory of the virtual external memory in step 407. The mobile terminal uses the external memory as the storage memory to store data generated during an operation of the mobile terminal in step 409.

In contrast, if it is determined that the external memory is not attached during the booting process in step 405, the mobile terminal recognizes the virtual external memory, that is, the built-in memory defined as the virtual external memory in step 403, as an external memory, and use the virtual external memory as the storage memory in step 411.

Therefore, the mobile terminal recognizes the built-in memory as the virtual external memory to allow an application to operate even when the mobile terminal performs booting without an external memory.

Since the battery is removed when an external memory is detached/attached, an external memory or a virtual external memory is set to a storage memory based on whether an external memory is attached during an initial booting process.

Thereafter, the mobile terminal ends the algorithm.

As described above, exemplary embodiments of the present invention provide a mobile terminal that operates without an external memory by allowing the mobile terminal to recognize a built-in memory as a virtual external memory in order to operate an application when the external memory does not exist in the mobile terminal that supports only one external memory.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for recognizing an external memory in a mobile terminal, the apparatus comprising:
   a built-in memory; and
   an external memory manager for defining the built-in memory of the mobile terminal as a virtual external memory that is addressable as an external memory after a booting process,
   wherein the external memory manager uses the virtual external memory as a storage memory when the booting process is performed without the external memory, and
   wherein, for continuous attachment recognition of the external memory, the external memory manager generates a dummy informing of detachment for the virtual external memory or informing of attachment for the virtual external memory.

2. The apparatus of claim 1, wherein the external memory manager sets the external memory to a subdirectory of the virtual external memory and uses the external memory as the storage memory when the booting process is performed with the external memory attached.

3. The apparatus of claim 1, wherein, if it is determined that the external memory is attached after the booting process is performed without the external memory, the external memory manager generates the dummy informing of detachment of the virtual external memory before generating a signal informing of attachment of the external memory.

4. The apparatus of claim 3, wherein the external memory manager recognizes as if the external memory was detached and then attached again through the dummy.

5. The apparatus of claim 1, wherein if it is determined that the external memory is detached after the booting process is performed with the external memory attached, the external memory manager generates a signal informing of the detachment of the external memory, and generates the dummy informing of attachment of the virtual external memory.

6. The apparatus of claim 5, wherein the external memory manager recognizes as if the external memory was attached again using the dummy after the external memory is detached.

7. A method for recognizing an external memory in a mobile terminal, the method comprising:
   defining a built-in memory of the mobile terminal as a virtual external memory that is addressable as an external memory after a booting process,
   when performing the booting process without the external memory, using the virtual external memory as a storage memory, and
   for continuous attachment recognition of the external memory, generating a dummy informing of detachment for the virtual external memory or informing of attachment for the virtual external memory.

8. The method of claim 7, further comprising:
   when performing the booting process with the external memory attached, setting the external memory to a subdirectory of the virtual external memory and using the external memory as the storage memory.

9. The method of claim 7, further comprising:
   if it is determined that the external memory is attached after performing the booting process without the external memory, generating the dummy informing of detachment of the virtual external memory before generating a signal informing of attachment of the external memory.

10. The method of claim 9, wherein the generating of the dummy informing of detachment of the external memory comprises:
    recognizing as if the external memory was detached and then attached again through the dummy.

11. The method of claim 7, further comprising:
    if it is determined that the external memory is detached after performing the booting process with the external memory attached, generating a signal informing of the detachment of the external memory, and generating the dummy informing of attachment of the virtual external memory.

12. The method of claim 11, wherein the generating of the signal informing of the detachment of the external memory comprises:
    recognizing as if the external memory was attached again using the dummy after the external memory is detached.

13. A mobile terminal for recognizing only one external memory, the mobile terminal comprising:
    an external memory manager for setting one of a built-in memory and an external memory to a storage memory during a booting process, and for changing the memory setting based on at least one of attachment and detachment of the external memory,
    wherein the external memory manager is configured to define the built-in memory of the mobile terminal as a virtual external memory that is addressable as the external memory when the booting process is performed without the external memory, and
    wherein, for continuous attachment recognition of the external memory, the external memory manager generates a dummy informing of detachment for the virtual external memory or informing of attachment for the virtual external memory.

14. The mobile terminal of claim 13, wherein the external memory manager uses the virtual external memory as the storage memory when performing the booting process without the external memory, and the external memory manager sets the external memory to the virtual external memory and uses the external memory as the storage memory when performing the booting process with the external memory attached.

15. The mobile terminal of claim 13, wherein, if it is determined that the external memory is attached after performing the booting process without the external memory, the external memory manager generates the dummy informing of detachment of the virtual external memory.

16. The mobile terminal of claim 15, wherein the external memory manager recognizes as if the external memory was detached and then attached again through the dummy.

17. The mobile terminal of claim 13, wherein, if it is determined that the external memory is detached after the booting process is performed with the external memory attached, the external memory manager generates the dummy informing of attachment of the virtual external memory.

18. The mobile terminal of claim 17, wherein the external memory manager recognizes as if the external memory was attached again using the dummy after the external memory is detached.

19. A method for recognizing an external memory in a mobile terminal, the method comprising:
   setting one of a built-in memory and an external memory to a storage memory during a booting process;
   changing the memory setting based on at least one of attachment and detachment of the external memory; and
   for continuous attachment recognition of the external memory, generating a dummy informing of detachment for the virtual external memory or informing of attachment for the virtual external memory,
   wherein the built-in memory is defined as a virtual external memory that is addressable as the external memory when the booting process is performed without the external memory.

20. The method of claim 19, further comprising:
   when performing the booting process without the external memory, using the virtual external memory as the storage memory; and
   when performing the booting process with the external memory attached, setting the external memory to the virtual external memory and uses the external memory as the storage memory.

21. The method of claim 19, further comprising:
   if it is determined that the external memory is attached after performing the booting process without the external memory, generating the dummy informing of detachment of the virtual external memory.

22. The method of claim 21, further comprising:
   recognizing as if the external memory was detached and then attached again through the dummy.

23. The method of claim 19, further comprising:
   when determining that the external memory is detached after performing the booting process with the external memory attached, generating the dummy informing of attachment of the external memory.

24. The method of claim 23, further comprising:
   recognizing as if the external memory was attached again using the dummy after the external memory is detached.

* * * * *